(12) United States Patent
Li (10) Patent No.: US 10,896,056 B2
(45) Date of Patent: Jan. 19, 2021

(54) CLUSTER EXPANSION METHOD AND APPARATUS, ELECTRONIC DEVICE AND STORAGE MEDIUM

(71) Applicant: SHENZHEN INTELLIFUSION TECHNOLOGIES CO., LTD., Shenzhen (CN)

(72) Inventor: Lan Li, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/627,762

(22) PCT Filed: Dec. 29, 2017

(86) PCT No.: PCT/CN2017/119641
§ 371 (c)(1),
(2) Date: Dec. 31, 2019

(87) PCT Pub. No.: WO2019/041701
PCT Pub. Date: Mar. 7, 2019

(65) Prior Publication Data
US 2020/0379796 A1    Dec. 3, 2020

(30) Foreign Application Priority Data
Aug. 30, 2017    (CN) .......................... 2017 1 0764058

(51) Int. Cl.
G06F 9/455    (2018.01)
G06F 9/50     (2006.01)

(52) U.S. Cl.
CPC ........ G06F 9/45558 (2013.01); G06F 9/5044 (2013.01); G06F 9/5088 (2013.01);
(Continued)

(58) Field of Classification Search
None
See application file for complete search history.

(56) References Cited

U.S. PATENT DOCUMENTS

2014/0189109 A1* 7/2014 Jang ...................... G06F 9/5083
                                                              709/224
2015/0229715 A1    8/2015 Sankar et al.

FOREIGN PATENT DOCUMENTS

CN    106354585 A    1/2017
CN    106354828 A    1/2017
(Continued)

OTHER PUBLICATIONS

International Search Report issued in corresponding International application No. PCT/CN2017/119641, dated May 31, 2018.
(Continued)

*Primary Examiner* — Lewis A Bullock, Jr.
*Assistant Examiner* — Melissa A Headly (57) ABSTRACT

A cluster expansion method includes: acquiring data of machines to be expanded; acquiring the number of machines in a cluster; when it is determined that a number of machines to be expanded is not a multiple of the number of the machines in the cluster, acquiring a total data amount of current fragments in the cluster and a fragment amount of the current fragments; according to the total data amount of the current fragments in the cluster, the fragment amount of the current fragments and the fragment amount of the machines to be expanded, migrating some data amount of each fragment in the current fragments to the machines to be expanded; and when it is determined that the number of the machines to be expanded is a multiple of the number of the machines in the cluster, configuring the machines to be expanded to be in the cluster.

9 Claims, 5 Drawing Sheets

(52) U.S. Cl.
CPC ............... *G06F 2009/4557* (2013.01); *G06F 2009/45595* (2013.01)

(56) References Cited

FOREIGN PATENT DOCUMENTS

| | | |
|---|---|---|
| CN | 106843745 A | 6/2017 |
| CN | 106844510 A | 6/2017 |

OTHER PUBLICATIONS

Written Opinion of the International Searching Authority for No. PCT/CN2017/119641, dated May 31, 2018.
Initial Publication for PCT/CN2017/119641.

\* cited by examiner

CLUSTER EXPANSION METHOD AND APPARATUS, ELECTRONIC DEVICE AND STORAGE MEDIUM

CROSS-REFERENCE TO RELATED APPLICATION

This application claims the benefit of priority from Chinese Patent Application No. 201710764058.7 entitled "CLUSTER EXPANSION METHOD AND APPARATUS, ELECTRONIC DEVICE AND STORAGE MEDIUM" and filed on Aug. 30, 2017, the content of which is hereby incorporated by reference in its entire by reference.

BACKGROUND

1. Technical Field

The present disclosure generally relates to databases field, and especially relates to a cluster expansion method and a cluster expansion apparatus, an electronic device and a storage medium.

3. Description of Related Art

A status of clusters (such as search engine clusters) in a conventional art is not invariable, and it is difficult to know in advance number of fragments required in the clusters. With the expansion of machines, or unexpected downtime services, the machines will be constantly added and removed from the cluster. When the machines and the fragments are added to the cluster, an address interval (such as hash interval) corresponding to different machines has changed, thereby data migration is required. It is resulted in a jitter phenomenon and a time-consuming and performance consuming operation.

In the conventional art, when the fragments of the machines are added, one or more fragments is usually divided into a plurality of sub-fragments, and then the one or more sub-fragments are used as fragments of new added machines, which can cause the pressure of data migration to be occurred on the one or more machines, and also can lead to a sudden increase in network load between the one or more machines, thereby an often called "hot spot" problem is appeared. That is to say, the machines for fragment segmentation will undertake all the data migration alone, thereby the jitter phenomenon is to occur more obviously and performance bottlenecks is to cause more easily.

When an original fragment in the cluster is divided into two sub-fragments, the address interval of the two sub-fragments (such as hash interval) is reduced so that data load of the machines can be decreased and the search can be accelerated. However, the address interval of other fragments (such as hash interval) in the cluster isn't changed. The query of the cluster is first separated and then is summarized. That is to say, only the query of each fragment is finished, the whole query process is completed. Therefore, here, the query speed is determined by the query speed of the undivided fragments, the efficiency of the whole query is basically not improved significantly. In this case, the cluster performance improvement can be obtained only by multiplying the machines.

SUMMARY

The technical problems to be solved: in view of the shortcomings of the related art, the present disclosure provides to a cluster expansion method and a cluster expansion apparatus, an electronic device and a storage medium, which can promote performance of a cluster, reduce or avoid data migration, and furthermore can realize load balancing.

The technical solution adopted for solving technical problems of the present disclosure is:

a cluster expansion method according to an embodiment of the present disclosure includes:

acquiring data of machines to be expanded, the data of the machines to be expanded including one or more of the following: a number of machines to be expanded, performance parameters of the machines to be expanded, and a fragment amount of the machines to be expanded;

acquiring a number of machines in a cluster;

when it is determined that the number of the machines to be expanded is not a multiple of the number of the machines in the cluster, acquiring a total data amount of current fragments in the cluster and a fragment amount of the current fragments;

migrating some data amount of each fragment in the current fragments to the machines to be expanded, according to the total data amount of the current fragments in the cluster, the fragment amount of the current fragments and the fragment amount of the machines to be expanded; and when it is determined that the number of the machines to be expanded is a multiple of the number of the machines in the cluster, configuring the machines to be expanded to be in the cluster, according to the performance parameters of the machines to be expanded.

According to an embodiment of the present disclosure, wherein the step of migrating some data amount of each fragment in the current fragments to the machines to be expanded, according to the total data amount of the current fragments in the cluster, the fragment amount of the current fragments and the fragment amount of the machines to be expanded, includes:

determining a data amount to be migrated of each fragment in the current fragments according to the total data amount of the current fragments, the fragment amount of the current fragments and the fragment amount of the machines to be expanded;

determining a data block to be migrated of each fragment in the current fragments, according to the data amount to be migrated of each fragment in the current fragments;

acquiring an address interval of the data block to be migrated of each fragment in the current fragments, according to the data block to be migrated of each fragment in the current fragments; and configuring each fragment in fragments of the machines to be expanded, according to the data block to be migrated of each fragment in the current fragments and the address interval of the data block to be migrated of each fragment in the current fragments.

According to an embodiment of the present disclosure, wherein the step of configuring each fragment in fragments of the machines to be expanded, according to the data block to be migrated of each fragment in the current fragments, and the address interval of the data block to be migrated of each fragment in the current fragments, includes:

evenly dividing the data block to be migrated of each fragment in the current fragments into at least one sub-data block, according to the fragment amount of the machines to be expanded;

evenly configuring the at least one sub-data block of each fragment in the current fragments to be each fragment in the fragments of the machines to be expanded, each fragment in the fragments of the machines to be expanded composing of one or more sub-data blocks; and configuring an address interval corresponding to the one or more sub-data blocks of each fragment in the fragments of the machines to be expanded to be an address interval of each fragment in the fragments of the machines to be expanded.

According to an embodiment of the present disclosure, wherein the cluster expansion method further includes when it is determined that the number of the machines to be expanded is not a multiple of the number of the machines in the cluster, under a schedule of an invocation mechanism of the cluster, configuring the machines to be expanded to be in the cluster by a asynchronous progressive form.

According to an embodiment of the present disclosure, wherein the step of configuring the machines to be expanded to be in the cluster, according to the performance parameters of the machines to be expanded, includes:

expanding the machines to be expanded in the cluster by collecting collection loops, and each collection loop in the cluster corresponding to a time parameter;

acquiring a storage data mount of each time period in the cluster; and configuring a collection loop of the machines to be expanded, according to the storage data amount of each time period in the cluster and the performance parameters of the machines to be expanded.

According to an embodiment of the present disclosure, wherein the step of configuring a collection loop of the machines to be expanded, according to the storage data amount of each time period in the cluster and the performance parameters of the machines to be expanded, includes one or more of the following combinations:

determining a time period of the storage data amount which is growing the fastest according to the storage data amount of each time period in the cluster, and further determining a time parameter corresponding to the time period as a time parameter of the collection loop; or determining a time period of the storage data amount exceeding a preset value, according to the storage data amount of each time period in the cluster, and further determining a time parameter corresponding to the time period as a time parameter of the collection loop; or configuring the machines to be expanded corresponding to each virtual node on the collection loop, according to the performance parameters of the machines to be expanded and a group of machines corresponding to each virtual node in the cluster.

According to an embodiment of the present disclosure, wherein the cluster expansion method further includes:

receiving an input index, a time corresponding to the index, and a file number corresponding to each document in the index;

querying a collection loop that matches with the time corresponding to the index, according to the time corresponding to the index;

querying a virtual node that matches with the file number corresponding to each document, according to the file number corresponding to each document;

determining machines corresponding to the matched virtual node on the collection loop; and acquiring documents in fragments of machines in the determined machines and further providing the acquired document to users.

A cluster expansion apparatus according to an embodiment of the present disclosure includes:

an acquiring unit configured to acquire data of machines to be expanded, the data of the machines to be expanded including one or more of the following: a number of machines to be expanded, performance parameters of the machines to be expanded, and a fragment amount of machines to be expanded;

the acquiring unit also configured to acquire a number of machines in a cluster;

the acquiring unit further configured to acquire a total data amount of current fragments in the cluster and the fragment amount of the current fragments when it is determined that the number of the machines to be expanded is not a multiple of the number of the machines in the cluster;

a configuration unit configured to configuring the machines to be expanded to be in the cluster, according to the total data amount of the current fragments in the cluster, the fragment amount of the current fragments and a fragment amount of the machines to be expanded;

the acquiring unit further configured to acquire a storage data amount of each time period in the cluster when it is determined that the number of the machines to be expanded is a multiple of the number of machines in the cluster;

the configuration unit further configured to configure the machines to be expanded to be in the cluster, according to the storage data amount of each time period in the cluster and the performance parameters of the machines to be expanded.

An electronic device includes a memory configured to store at least one instruction therein, and a processor configured to perform the at least one instruction to implement the cluster expansion method in the embodiment of the present disclosure.

A computer readable storage medium is provided for storing at least one instruction which is performed by a processor to implement the cluster expansion method in the embodiment of the present disclosure.

The present disclosure provides the advantages as below.

The present disclosure includes: acquiring data of machines to be expanded, the data of the machines to be expanded including one or more of the following: a number of machines to be expanded, performance parameters of the machines to be expanded, and a fragment amount of machines to be expanded; acquiring a number of machines in a cluster; when it is determined that the number of the machines to be expanded is not a multiple of the number of the machines in the cluster, acquiring a total data amount of current fragments in the cluster and the fragment amount of the current fragments; configuring the machines to be expanded to be in the cluster, according to the total data amount of the current fragments in the cluster, the fragment amount of the current fragments and the fragment amount of the machines to be expanded; when it is determined that the number of the machines to be expanded is a multiple of the number of the machines in the cluster, acquiring a storage data amount of each time period in the cluster; configuring the machines to be expanded to be in the cluster, according to the storage data amount of each time period in the cluster and the performance parameters of the machines to be expanded. So, it can promote performance of the cluster, reduce or avoid data migration, and furthermore can realize load balancing.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In order to make the above purposes, features and advantages of the present disclosure more obvious and thorough understand of the subject matter presented herein, the following is a further detailed description of the present disclosure in combination with the accompanying drawings and the specific implementation embodiments.

In order to better understand the following embodiments, a brief introduction is made to the concept of clusters, which includes, but not limited to: search engine clusters.

A cluster is generally composed of one or more machines, with each machine corresponding to a node. That is to say, a cluster is organized together by one or more nodes to provide index and search functions. At least one fragment is distributed in each machine to store index data. An index is a collection of documents with similar characteristics, such as an index of customer data and an index of a product catalog, etc. An index is identified by a name and a document is a base information unit that can be indexed. An index can include a plurality of documents that is assigned on each fragment. Each document corresponds to a file number so that and documents in the index can be indexed, searched, updated, and deleted.

Figure 1:
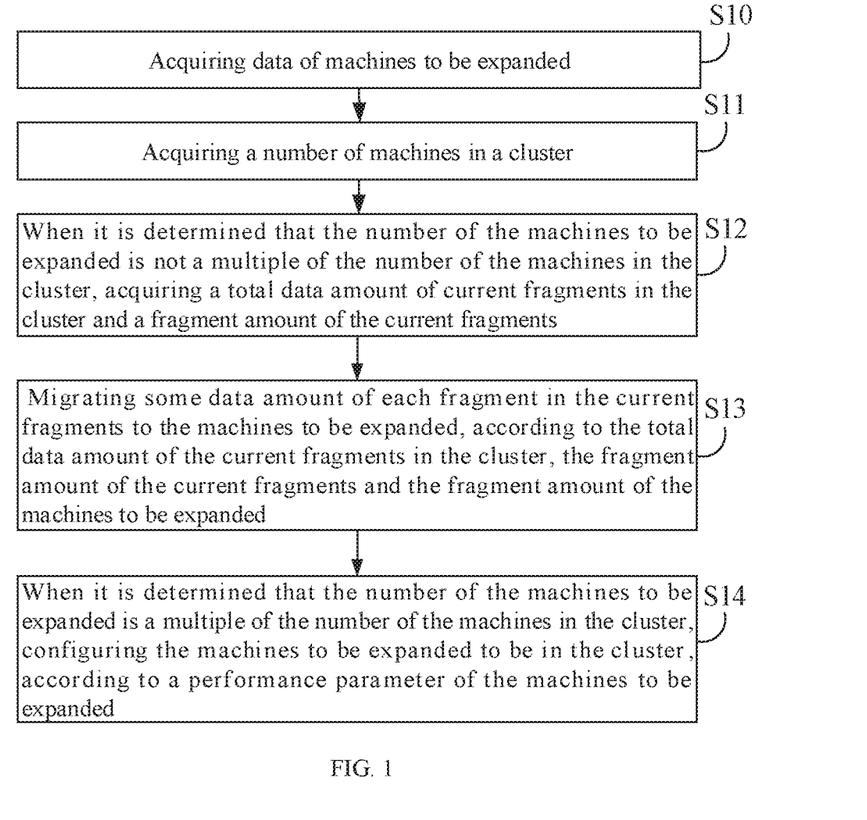
FIG. 1 is a flowchart of a cluster expansion method in accordance with an embodiment of the present disclosure.

FIG. 1 illustrates a flowchart of a cluster expansion method in accordance with an embodiment of the present disclosure. According to different requirements, the sequence of steps in the flowchart can be changed and some steps can be omitted.

S10, acquiring data of machines to be expanded by an electronic device.

In an embodiment of the present disclosure, the data of the machines to be expanded includes: but not limited to: one or more of the following: a number of machines to be expanded, performance parameters of the machines to be expanded, and a fragment amount of the machines to be expanded. The performance parameters include configurations of processors, memory storage capacity, and so on. The machines to be expanded are machines to be added to a cluster.

S11, the electronic device is configured to acquire a number of machines in the cluster.

In an embodiment of the present disclosure, the number of the machines in the cluster is the number of the machines that have been configured in the cluster.

In an embodiment of the present disclosure, it is necessary to first determine whether the number of machines to be expanded is a multiple of the number of machines in the cluster. Step S12 is performed, When it is determined that the number of the machines to be expanded is not a multiple of the number of the machines in the cluster. While, step S14 is performed, when it is determined that the number of the machines to be expanded is a multiple of the number of machines in the cluster.

S12, when it is determined that the number of the machines to be expanded is not a multiple of the number of the machines in the cluster, the electronic device is configured to acquire a total data amount of current fragments in the cluster and a fragment amount of the current fragments.

In an embodiment of the present disclosure, the amount of the current fragments can be one or more. When it is determined that the number of the machines to be expanded is not a multiple of the number of the machines in the cluster, it is needed to migrate some data amount of the current fragments to the machines to be expanded during configuring the machines to be expanded, so as to relieve pressure applied on the machines in the cluster. Detail description is shown in subsequent embodiments.

S13, the electronic device is further configured to migrate some data amount of each fragment in the current fragments to the machines to be expanded, according to the total data amount of the current fragments in the cluster, the fragment amount of the current fragments and the fragment amount of the machines to be expanded, so as to configure the machines to be expanded to be in the cluster.

In an embodiment of the present disclosure, the step of migrating some data amount of each fragment in the current fragments to the machines to be expanded, according to the total data amount of the current fragments in the cluster, the fragment amount of the current fragments and the fragment amount of the machines to be expanded, so as to configure the machines to be expanded to be in the cluster, includes:

(a1) determining a data amount to be migrated of each fragment in the current fragments, according to the total data amount of the current fragments, the fragment amount of the current fragments and the fragment amount of the machines to be expanded.

Furthermore, the data amount to be migrated of each fragment is some data amount of each fragment to be migrated to the machines to be expanded.

In an embodiment, the data amount to be migrated of each fragment in the current fragments is equal to (the data amount of each fragment in the current fragments–the total data amount in the cluster/(the fragment amount of the current fragments+the fragment amount of the machines to be expanded)).

(a2) determining a data block to be migrated of each fragment in the current fragments, according to the data amount to be migrated of each fragment in the current fragments.

(a3) acquiring an address interval of the data block to be migrated of each fragment in the current fragments, according to the data block to be migrated of each fragment in the current fragments.

In an embodiment of the present disclosure, the address interval includes, but not limited to, a hash interval.

(a4) configuring each fragment in fragments of the machines to be expanded, according to the data block to be migrated of each fragment in the current fragments and the address interval of the data block to be migrated of each fragment in the current fragments.

In an embodiment, evenly distributing the data amount to be migrated of each fragment in the current fragments in each fragment of fragments to be expanded. So, the step of configuring each fragment in fragments of the machines to be expanded, according to the data block to be migrated of each fragment in the current fragments and the address interval of the data block to be migrated of each fragment in the current fragments, includes:

(a41) evenly dividing the data block to be migrated of each fragment in the current fragments into at least one sub-data block, according to the fragment amount of the machines to be expanded.

(a42) evenly configuring the at least one sub-data block of each fragment in the current fragments to be each fragment in the fragments of the machines to be expanded, each fragment in the fragments of the machines to be expanded composing of one or more sub-data blocks.

(a43) configuring an address interval corresponding to the one or more sub-data blocks of each fragment in the fragments of the machines to be expanded to be an address interval of each fragment in the fragments of the machines to be expanded.

Figure 2:
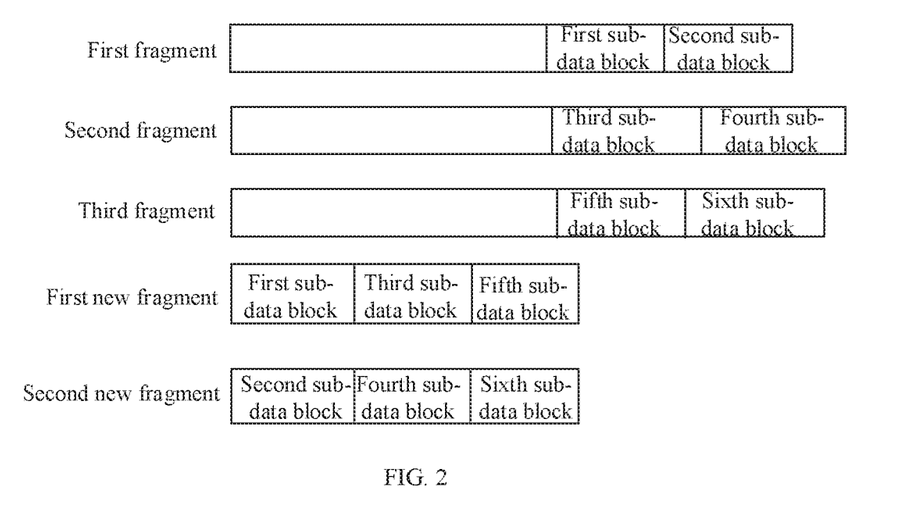
FIG. 2 is a schematic diagram of a fragment data migration of the cluster expansion method of FIG. 1.

For example, referring to FIG. 2, there are three fragments in the current fragment, namely a first fragment, a second fragment and a third fragment. Each data amount of the first fragment, the second fragment and the third fragment is 100. There are two machines to be expanded, and one fragment in each machine to be expanded. That is, there are altogether two fragments of the machines to be expanded, respectively named a first new fragment and a second new fragment. The data amount to be migrated of each of the first fragment, the second fragment and the third fragment is: 100−300/5=40. That is to say, each of the first fragment, the second fragment and the third fragment needs to migrate sub-data blocks of data amount with 20 units to the first new fragment. Similarly, each of the first fragment, the second fragment and the third fragment also needs to migrate sub-data blocks of data amount with 20 units to the second new fragment. The first new fragment is composed of a first sub-data block, a third sub-data block and a fifth sub-data block, and the second new fragment is composed of a second sub-data block, a fourth sub-data block and a sixth sub-data block. The hash interval of the first new fragment is composed of a first hash interval corresponding to the first sub-data block, a third hash interval corresponding to the third sub-data block, and a fifth hash interval corresponding to the fifth sub-data block. Similarly, The hash interval of the second new fragment is composed of a second hash interval corresponding to the second sub-data block, a fourth hash interval corresponding to the fourth sub-data block, and a sixth hash interval corresponding to the sixth sub-data block.

The query of the cluster is first separated and then is summarized. That is to say, only the query of each fragment is finished, the whole query process is completed. Accordingly, in the embodiment of the present disclosure shown above, the electronic device is configured to migrate some data amount of each fragment in the current fragments to the machines to be expanded so as to configure the machines to be expanded to be in the cluster. That is, by migrating a portion of the data amount of each fragment in the cluster before configuration, the data amount of each fragment in the cluster after configuration is less than the data amount of the fragment with the maximum data amount before configuration. Thus, the query time of the cluster after configuration can be reduced and the performance of the cluster can be improved. For example, each additional machine in the cluster can significantly improve the performance of the cluster, rather than doubling the number of the machines to improve its search efficiency. Moreover, the data migration caused by node partition can be also weakened and the influence of network performance can be non-obvious.

Furthermore, in an embodiment of the present disclosure, since the data amount of each fragment in the cluster after the configuration is uniform, the query time of the cluster can be ensured to be the shortest, which can further improve the performance of the cluster.

In an embodiment of the present disclosure, the data migration of the fragment for each machine in the cluster can't be performed at a same time, but asynchronously performing under a scheduling of invocation mechanisms similar to perform multithreaded tasks under a processor scheduling. A scheduling principle of the invocation mechanisms is a time period to evade tasks such as query or index creation, for example, according to the task state of each fragment, the data of a free fragment is first migrated, and the data of the fragment with heavy tasks is finally migrated. Therefore, when it is determined that the number of the machines to be expanded is not a multiple of the number of the machines in the cluster, under the scheduling of invocation mechanisms of the cluster, the machines to be expanded can be configured to be in the cluster asynchronously, which can not only avoid jitter, but also can optimize its overall migration time.

Figure 3:
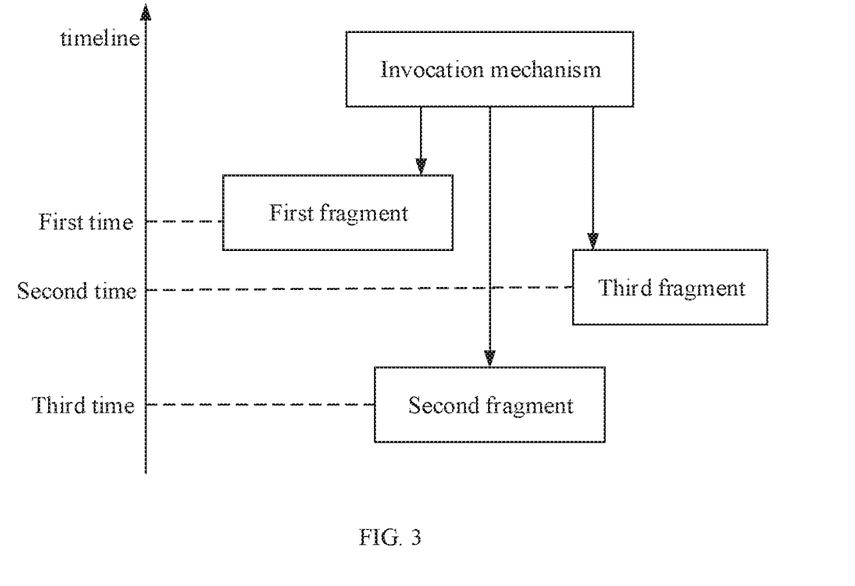
FIG. 3 is a schematic diagram of the fragment data migration by an asynchronous progressive form of the cluster expansion method of FIG. 1.

Referring to FIG. 3, some data of the first fragment, the second fragment and the third fragment needs to be asynchronously migrated to the fourth fragment. Performing data migration on the first fragment at a first time, performing data migration on the second fragment at a second time, and performing data migration on the third fragment at a third time. The first time, the second time and the third time are all different.

S14, when it is determined that the number of the machines to be expanded is a multiple of the number of the machines in the cluster, the electronic device is configured to configure the machines to be expanded to be in the cluster, according to the performance parameters of the machines to be expanded.

In an embodiment of the present disclosure, the machines to be expanded in the cluster can be expanded by collecting collection loops. In this way, the index data can be stored and queried in a new index collection (that is, in a fragment of the machines to be expanded) without migrating the data. The collection is a complete index collection logically.

Figure 4:
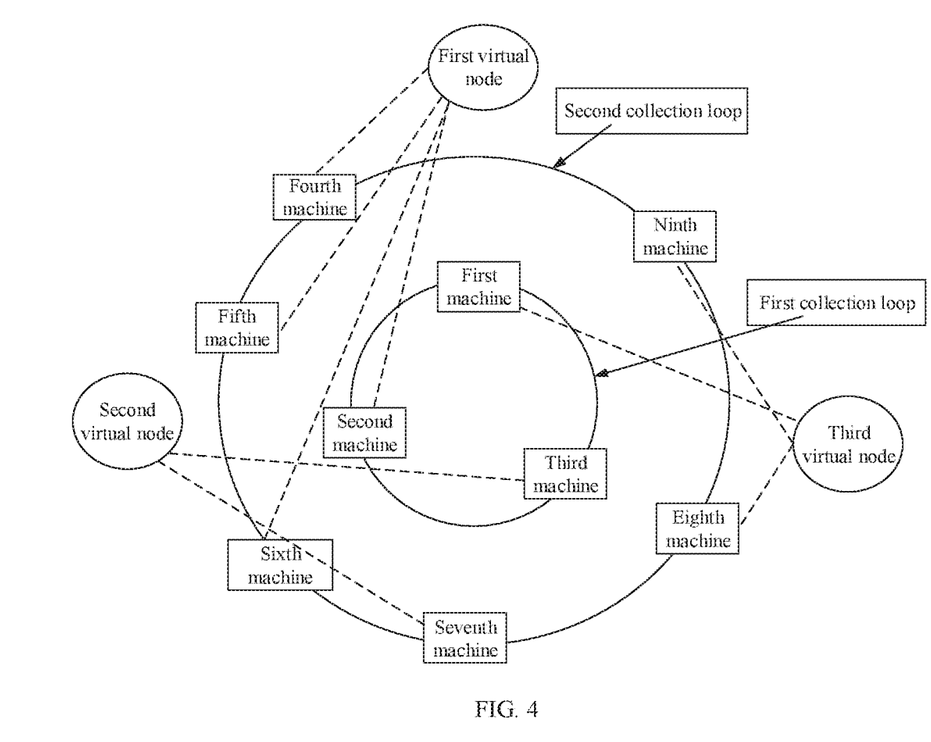
FIG. 4 is a schematic diagram of a collection loop in the cluster of the cluster expansion method of FIG. 1.

There can be a plurality of different collection loops in the cluster, each collection loop corresponds to a time parameter. That is to say, each collection loop is located on a different time dimension coordinate, and different collection loops store index data for different time periods. For example, a first collection loop is corresponding to a collection index data set of 2016, and the second collection loop is corresponding to a collection index data set of 2017. In addition, the number of collection loops can be different in different time periods, and the denseness degree of the collection loop on the time coordinate is proportional to the data amount needed to be stored in the time coordinate. For example, for the index data in 2017, the data amount to be stored can be 1 million, and the time parameter, in months, can be 12 collection loops. While, the data amount needed to be stored in 2016 can be 300 thousand, and the time parameter, in quarters, can be 4 collection loops.

The plurality of different collection loops has a same virtual node, so, the fragment on different collection loops has a same hash interval. But on each collection loop, each virtual node is corresponding to different machines.

For example, referring to FIG. 4, there are three virtual nodes: a first virtual node, a second virtual node and a third virtual node. And, there are two collection loops: a first collection loop and a second collection loop. The first collection loop is corresponding to a first time parameter and the second collection loop is corresponding to a second time parameter. A first machine, a second machine and a third machine are respectively located on the first collection loop. A fourth machine, a fifth machine, a sixth machine, a seventh machine, an eighth machine and a ninth machine are respectively located on the second collection loop. On the first collection loop, the first virtual node is corresponding to the second machine, the second virtual node is corresponding to the third machine, and the third virtual node is corresponding to the first machine. Similarly, on the second collection loop, the first virtual node is corresponding to the fourth machine, the fifth machine and the sixth machine, the second virtual node is corresponding to the seventh machine, and the third virtual node is corresponding to the eighth machine and the ninth machine.

In an embodiment of the present disclosure, the machines to be expanded in the cluster can be expanded by the collection loops, each collection loop in the cluster is corresponding to a time parameter. Acquiring a storage data mount of each time period in the cluster, and configuring a collection loop of the machines to be expanded according to the storage data amount of each time period in the cluster and the performance parameters of the machines to be expanded.

The step of configuring the collection loop of the machines to be expanded according to the storage data amount of each time period in the cluster and the performance parameters of the machines to be expanded, includes one or more of the following combinations:

(b1) determining a time period of the storage data amount which is growing the fastest according to the storage data amount of each time period in the cluster, and further determining a time parameter corresponding to the time period as a time parameter of the collection loop.

(b2) determining a time period of the storage data amount exceeding a preset value according to the storage data amount of each time period in the cluster, and further determining a time parameter corresponding to the time period as a time parameter of the collection loop.

(b3) configuring the machines to be expanded corresponding to each virtual node on the collection loop according to the performance parameters of the machines to be expanded and a group of machines corresponding to each virtual node in the cluster.

In an embodiment, it can be according to the performance parameters (that is, processors, disk volumes, and other configuration parameters) of the machines to be expanded and the performance parameters of the group of machines corresponding to each virtual node in the cluster, evenly configuring the machines to be expanded which are correspondingly configured on the collection loop to more balance the overall performance of the group of machines corresponding to each virtual node. Therefore, by the embodiment of the present disclosure, it can optimize data with a more uniform distribution by using the virtual nodes. Because the performance of each machine is different, in order to avoid poor load balancing.

For example, there are two virtual nodes that a first virtual node is corresponding to two machines, and a second virtual node has no a corresponding machine. When performance parameters of one machine to be expanded amounts equal to the sum of the performance parameters of the two machines corresponding to the first virtual node, the one machine to be expanded can be configured to the second virtual node.

In an embodiment of the present disclosure, when expanding the machines to be expanded in the cluster by the collection loop, during creating a new index, it is needed to input a time parameter of the new index, and query a collection loop corresponding to the input time parameter on the collection loops of the cluster. And then, on the collection loop which is found, the indexes are stored in the machine under different virtual nodes, and the virtual node corresponding to a file number of each document in the index is recorded.

When querying the index, receiving an input index, a time corresponding to the index, and a file number corresponding to each document in the index; querying a collection loop that matches with the time corresponding to the index, according to the time corresponding to the index; querying a virtual node that matches the file number corresponding to each document according to the file number corresponding to each document; determining machines corresponding to the matched virtual node on the collection loop; and acquiring documents in fragments of machines in the determined machines and further providing the acquired document to users.

By multiply expanding the machines in the cluster, data migration can be completely avoided without data jitter. At the same time, due to without data migration, it also can avoid the occupation of network bandwidth and loss of system performance, which can save time and is more conducive to upgrade and update the system.

The present disclosure includes: acquiring data of machines to be expanded, the data of the machines to be expanded including one or more of the following: a number of the machines to be expanded, performance parameters of the machines to be expanded, and a fragment amount of the machines to be expanded; acquiring a number of machines in a cluster; when it is determined that the number of the machines to be expanded is not a multiple of the number of the machines in the cluster, acquiring a total data amount of current fragments in the cluster and a fragment amount of the current fragments; migrating some data amount of each fragment in the current fragments to the machines to be expanded, according to the total data amount of the current fragments in the cluster, the fragment amount of the current fragments and the fragment amount of the machines to be expanded; and when it is determined that the number of the machines to be expanded is a multiple of the number of the machines in the cluster, configuring the machines to be expanded to be in the cluster, according to the performance parameters of the machines to be expanded. So, it can promote performance of the cluster, reduce or avoid data migration, and furthermore can realize load balancing.

Figure 5:
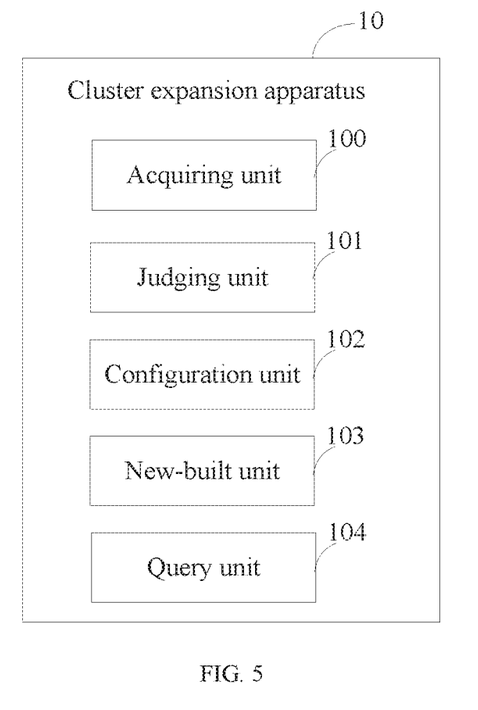
FIG. 5 is a functional module diagram of the cluster expansion apparatus in accordance with an embodiment of the present disclosure.

Referring to FIG. 5, a functional module diagram of the cluster expansion apparatus 16 in accordance with an embodiment is shown. The cluster expansion apparatus 16 includes an acquiring unit 100, a judging unit 101, a configuration unit 102, a new-built unit 103 and a query unit 104. The units of the present disclosure, which is stored in the memory, refer to a series of computer program segments that can be performed by the processor of the cluster extension device to complete fixed functions. In an embodiment of the present disclosure, the functions of each unit will be described in detail below.

The acquiring unit 100 is configured to acquire data of machines to be expanded.

In an embodiment of the present disclosure, the data of the machines to be expanded includes: but not limited to: one or more of the following: a number of the machines to be expanded, performance parameters of the machines to be expanded, and a fragment amount of the machines to be expanded. The performance parameters include configurations of processors, memory storage capacity, and so on.

The acquiring unit 100 is configured to acquire a number of machines in a cluster.

In an embodiment of the present disclosure, the number of the machines in the cluster is the number of the machines that have been configured in the cluster.

In an embodiment of the present disclosure, the acquiring unit 100 is configured to determine whether the number of the machines to be expanded is a multiple of the number of the machines in the cluster. When it is determined that the number of the machines to be expanded is not a multiple of the number of the machines in the cluster, the acquiring unit 100 is configured to acquire the total data amount of current fragments in the cluster and the fragment amount of the current fragments. While, when it is determined that the number of the machines to be expanded is not a multiple of the number of the machines in the cluster, the acquiring unit 100 is configured to acquire a storage data mount of each time period in the cluster.

When it is determined that the number of the machines to be expanded is not a multiple of the number of the machines in the cluster, the acquiring unit 100 is configured to acquire the total data amount of current fragments in the cluster and the fragment amount of the current fragments.

In an embodiment of the present disclosure, the amount of the current fragments can be one or more. When it is determined that the number of the machines to be expanded is not a multiple of the number of the machines in the cluster, it is needed to migrate some data amount of the current fragments to the machines to be expanded during configuring the machines to be expanded, so as to relieve pressure on the machines in the cluster. Detail description is shown in subsequent embodiments.

The configuration unit 102 is configured to migrate some data amount of each fragment in the current fragments to the machines to be expanded so as to configure the machines to be expanded to be in the cluster, according to the total data amount of the current fragments in the cluster, the fragment amount of the current fragments and the fragment amount of the machines to be expanded.

In an embodiment of the present disclosure, the step of migrating some data amount of each fragment in the current fragments to the machines to be expanded so as to configure the machines to be expanded to be in the cluster, according to the total data amount of the current fragments in the cluster, the fragment amount of the current fragments and the fragment amount of the machines to be expanded, includes:

(a1) determining a data amount to be migrated of each fragment in the current fragments, according to the total data amount of the current fragments, the fragment amount of the current fragments and the fragment amount of the machines to be expanded.

In an embodiment, the data amount to be migrated of each fragment in the current fragments is equal to (the data amount of each fragment in the current fragments–the total data amount in the cluster/(the fragment amount of the current fragments+the fragment amount of the machines to be expanded)).

(a2) determining a data block to be migrated of each fragment in the current fragments, according to the data amount to be migrated of each fragment in the current fragments.

(a3) acquiring an address interval of the data block to be migrated of each fragment in the current fragments, according to the data block to be migrated of each fragment in the current fragments.

In an embodiment of the present disclosure, the address interval includes, but not limited to, a hash interval.

(a4) configuring each fragment in fragments of the machines to be expanded, according to the data block to be migrated of each fragment in the current fragments and the address interval of the data block to be migrated of each fragment in the current fragments.

In an embodiment, evenly distributing the data amount to be migrated of each fragment in the current fragments in each fragment of the fragments to be expanded. So, the configuration unit 10 is configured to configure each fragment in fragments of the machines to be expanded according to the data block to be migrated of each fragment in the current fragments and the address interval of the data block to be migrated of each fragment in the current fragments, includes:

(a41) evenly dividing the data block to be migrated of each fragment in the current fragments into at least one sub-data block, according to the fragment amount of the machines to be expanded.

(a42) evenly configuring the at least one sub-data block of each fragment in the current fragments to be each fragment in the fragments of the machines to be expanded, each fragment in the fragments of the machines to be expanded composing of one or more sub-data blocks.

(a43) configuring an address interval corresponding to the one or more sub-data blocks of each fragment in the fragments of the machines to be expanded to be an address interval of each fragment in the fragments of the machines to be expanded.

For example, referring to FIG. 2, there are three fragments in the current fragment, namely a first fragment, a second fragment and a third fragment. Each data amount of the first fragment, the second fragment and the third fragment is 100. There are two machines to be expanded, and one fragment in each machine to be expanded. That is, there are altogether two fragments of the machines to be expanded, respectively named a first new fragment and a second new fragment. The data amount to be migrated of each of the first fragment, the second fragment and the third fragment is: 100−300/5=40. That is to say, each of the first fragment, the second fragment and the third fragment needs to migrate sub-data blocks of data amount with 20 units to the first new fragment. Similarly, each of the first fragment, the second fragment and the third fragment also needs to migrate sub-data blocks of data amount with 20 units to the second new fragment. The first new fragment is composed of a first sub-data block, a third sub-data block and a fifth sub-data block, and the second new fragment is composed of a second sub-data block, a fourth sub-data block and a sixth sub-data block. The hash interval of the first new fragment is composed of a first hash interval corresponding to the first sub-data block, a third hash interval corresponding to the third sub-data block, and a fifth hash interval corresponding to the fifth sub-data block. Similarly, The hash interval of the second new fragment is composed of a second hash interval corresponding to the second sub-data block, a fourth hash interval corresponding to the fourth sub-data block, and a sixth hash interval corresponding to the sixth sub-data block.

The query of the cluster is first separated and then is summarized. That is to say, only the query of each fragment is finished, the whole query process is completed. Accordingly, in the embodiment of the present disclosure shown above, since the data amount of each fragment in the cluster is uniform, each additional machine in the cluster can significantly improve the performance of the cluster, rather than doubling the number of machines to improve its search efficiency. Moreover, the data migration caused by node partition can be also weakened and the influence of network performance can be non-obvious.

In an embodiment of the present disclosure, the data migration of the fragment for each machine in the cluster can't be performed at a same time, but asynchronously performing under a scheduling of invocation mechanisms similar to perform multithreaded tasks under a processor scheduling. A scheduling principle of the invocation mechanisms is a time period to evade tasks such as query or index creation, for example, according to the task state of each fragment, the data of a free fragment is first migrated and the data of the fragment with heavy tasks is finally migrated. Therefore, When it is determined that the number of the machines to be expanded is not a multiple of the number of the machines in the cluster, under the scheduling invocation mechanisms of the cluster, the machines to be expanded can be configured to be in the cluster asynchronously, which can not only avoid jitter, but also can optimize its overall migration time.

Referring to FIG. 3, some data of the first fragment, the second fragment and the third fragment needs to be asynchronously migrated to the fourth fragment. Performing data migration on the first fragment at a first time, performing data migration on the second fragment at a second time, and performing data migration on the third fragment at a third time. The first time, the second time and the third time are all different.

When it is determined that the number of the machines to be expanded is a multiple of the number of the machines in the cluster, the configuration unit 102 is configured to configure the machines to be expanded to be in the cluster, according to the performance parameters of the machines to be expanded.

In an embodiment of the present disclosure, the machines to be expanded in the cluster can be expanded by collecting collection loops. In this way, the index data can be stored and queried in a new index collection (that is, in a fragment of the machines to be expanded) without migrating the data. The collection is a complete index collection logically.

There can be a plurality of different collection loops in the cluster, each collection loop corresponds to a time parameter. That is to say, each collection loop is located on a different time dimension coordinate, and different collection loops store index data for different time periods. For example, a first collection loop is corresponding to a collection index data set of 2016, and the second collection loop is corresponding to a collection index data set of 2017. In addition, the number of collection loops can be different in different time periods, and the denseness degree of the collection loop on the time coordinate is proportional to the data amount needed to be stored in the time coordinate. For example, for the index data in 2017, the data amount to be stored can be 1 million, and the time parameter, in months, can be 12 collection loops. While, the data amount needed to be stored in 2016 can be 300 thousand, and the time parameter, in quarters, can be 4 collection loops.

The plurality of different collection loops has a same virtual node, so, the fragment on different collection loops has a same hash interval. But on each collection loop, each virtual node is corresponding to different machines.

For example, referring to FIG. 4, there are three virtual nodes: a first virtual node, a second virtual node and a third virtual node. And, there are two collection loops: a first collection loop and a second collection loop. The first collection loop is corresponding to a first time parameter and the second collection loop is corresponding to a second time parameter. A first machine, a second machine and a third machine are respectively located on the first collection loop. A fourth machine, a fifth machine, a sixth machine, a seventh machine, an eighth machine and a ninth machine are respectively located on the second collection loop. In the first collection loop, the first virtual node is corresponding to the second machine, the second virtual node is corresponding to the third machine, and the third virtual node is corresponding to the first machine. Similarly, on the second collection loop, the first virtual node is corresponding to the fourth machine, the fifth machine and the sixth machine, the second virtual node is corresponding to the seventh machine, and the third virtual node is corresponding to the eighth machine.

The configuration unit 102 is configured to expand the machines to be expanded in the cluster by the collection loops. Each collection loop in the cluster is corresponding to a time parameter. Acquiring a storage data mount of each time period in the cluster, and configuring a collection loop of the machines to be expanded, according to the storage data amount of each time period in the cluster and the performance parameters of the machines to be expanded.

The configuration unit 102 is configured to configure the collection loop of the machines to be expanded, according to the storage data amount of each time period in the cluster and the performance parameters of the machines to be expanded, comprises one or more of the following combinations:

(b1) determining a time period of the storage data amount which is growing the fastest according to the storage data amount of each time period in the cluster, and further determining a time parameter corresponding to the time period as a time parameter of the collection loop.

(b2) determining a time period of the storage data amount exceeding a preset value, according to the storage data amount of each time period in the cluster, and further determining a time parameter corresponding to the time period as a time parameter of the collection loop.

(b3) configuring the machines to be expanded corresponding to each virtual node on the collection loop, according to the performance parameters of the machines to be expanded and a group of machines corresponding to each virtual node in the cluster.

In an embodiment, it can be according to the performance parameters (processors, disk volumes, and other configuration parameters) of the machines to be expanded and the performance parameters of the group of machines corresponding to each virtual node in the cluster, evenly configuring the machines to be expanded which are correspondingly configured on the collection loop to more balance the overall performance of the group of machines corresponding to each virtual node. Therefore, by the embodiment of the present disclosure, it can optimize data with a more uniform distribution by using the virtual nodes. Because the performance of each machine is different, in order to avoid poor load balancing.

For example, there are two virtual nodes that a first virtual node is corresponding to two machines, and a second virtual node has no a corresponding machine. When performance parameters of one machine to be expanded amounts equal to the sum of the performance parameters of the two machines corresponding to the first virtual node, the one machine to be expanded can be configured to the second virtual node.

In an embodiment of the present disclosure, when expanding the machines to be expanded in the cluster by the collection loop, the new-built unit 103 is specifically configured to:

Query the collection loop corresponding to the input time parameter on the collection loops of the cluster during creating a new index and needing to input the time parameter of the new index. And then, on the collection loop which is found, the indexes are stored in the machine under different virtual nodes, and the virtual node corresponding to a file number of each document in the index is recorded.

The query unit 104 is specifically configured to:

When querying the index, receiving an input index, a time corresponding to the index, and a file number corresponding to each document in the index; querying a collection loop that matches with the time corresponding to the index, according to the time corresponding to the index; querying a virtual node that matches the file number corresponding to each document, according to the file number corresponding to each document; determining machines corresponding to the matched virtual node on the collection loop; and acquiring documents in fragments of machines in the determined machines and further providing the acquired document to users.

By multiply expanding the machines in the cluster, data migration can be completely avoided without data jitter. At the same time, due to without data migration, it also can avoid the occupation of network bandwidth and loss of system performance, which can save time and is more conducive to upgrade and update the system.

The present disclosure includes: acquiring data of machines to be expanded, the data of the machines to be expanded including one or more of the following: a number of the machines to be expanded, performance parameters of the machines to be expanded, and a fragment amount of machines to be expanded; acquiring a number of machines in a cluster; When it is determined that the number of the machines to be expanded is not a multiple of the number of the machines in the cluster, acquiring a total data amount of current fragments in the cluster and the fragment amount of the current fragments; migrating some data amount of each fragment in the current fragments to the machines to be expanded according to the total data amount of the current fragments in the cluster, the fragment amount of the current fragments and the fragment amount of the machines to be expanded; and when it is determined that the number of the machines to be expanded is a multiple of the number of the machines in the cluster, configuring the machines to be expanded to be in the cluster, according to the performance parameters of the machines to be expanded. So, it can promote performance of the cluster, reduce or avoid data migration, and furthermore can realize load balancing.

The integrated units above, implemented in a form of software function modules, can be stored in a computer readable storage medium. The software functional module above mentioned is stored in a storage medium and includes instructions to enable a computer device (which can be personal computers, servers, or network devices, etc.) or a processor to perform some steps of the method described in each embodiment of the present disclosure.

Figure 6:
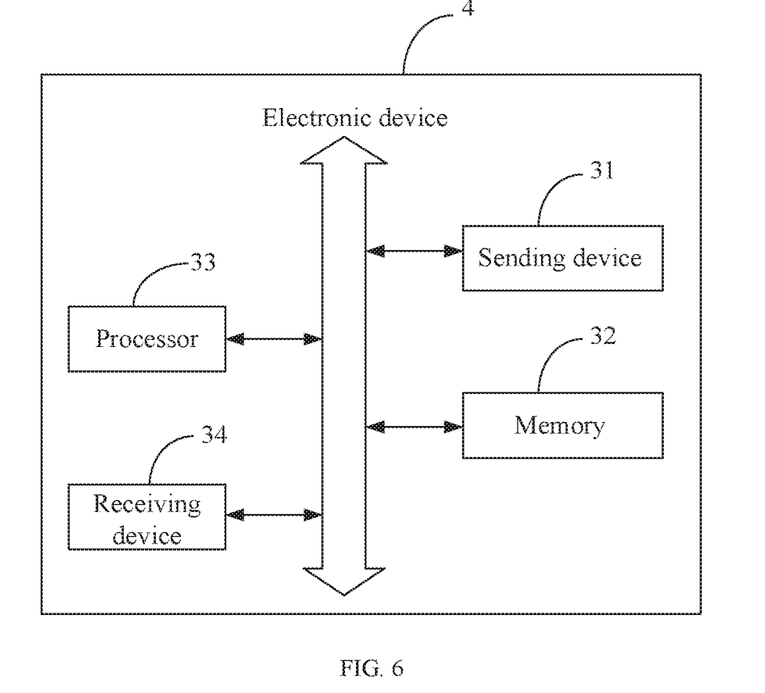
FIG. 6 is a schematic diagram of an electronic device using the cluster expansion method in accordance with an embodiment of the present disclosure.

Referring to FIG. 6, the electronic device 4 includes at least one sending device 31, at least one a memory 32, at least one processor 33, at least one receiving device 34 and at least one communication bus. The communication bus is configured to implement connection communication between these components.

The electronic device 4 is a device capable of automatically performing numerical calculations and/or information processing in accordance with pre-set or stored instructions, whose hardware includes, but not limited to, a microprocessor, an Application Specific Integrated Circuit (ASIC), a field-programmable Gate Array (FPGA), a Digital Signal Processor (DSP), and an embedded device etc. The electronic device 4 further can also include a network device and/or a user device. Furthermore, the network device includes, but not limited to, a single network server, a server group composed of multiple network servers or a Cloud composing of a large number of hosts or network servers based on Cloud Computing. The cloud computing is a kind of distributed computing and a super virtual computer composed of a group of loosely coupled computers.

The electronic device 4 can be, but not limited to, any electronic product for human-computer interaction by means of keyboards, touch pads or voice control devices such as tablet computers, smart phones, Personal Digital Assistants (PDAs), smart wearable devices, camera devices, monitoring devices and other terminals.

The Network of the electronic device 4 can include, but not limited to, the Internet, wide area Network, metropolitan area Network, local area Network, Virtual Private Network (VPN), etc.

Furthermore, the receiving device 34 and the sending device 31 can be wired sending ports or wireless devices, for example, including an antenna device for data communication with other devices.

The memory 32 is configured to store program codes, and it can be a circuit, with storage function without a physical form, in integrated circuits, such as RAMs (Random Access Memories), FIFOs (First In First Outs) etc. Alternatively, the memory 32 can be a memory with a physical form, such as a memory stick, a TF card (trans-flash Card), a smart media card, a secure digital card, a flash card and other storage devices.

The processor 33 can include one or more microprocessors or digital processors and it also can invoke program codes stored in the memory 32 to perform related functions. For example, the units, shown in FIG. 3, are program codes stored in the memory 32 and performed by the processor 33 to implement the cluster expansion method described above. The processor 33, also known as a CPU (Central Processing Unit), is a very large scale integrated circuit which is the Core of operation and the Control Unit.

A computer readable storage medium in accordance with an embodiment of the present disclosure is provided for storing at least one instructions performed by an electronic device which includes one or more processors to implement the cluster expansion method described above.

In some embodiments of the present disclosure, it can be understood that the disclosed systems, devices and methods can be implemented by other ways. For example, the device of the embodiment described above is only a schematic description, for example, the partition of the modules is only a logical function partition, which can be implemented by another way.

The modules described as separation parts can or can't be physically separated, and the parts displayed as modules can or can't be physical units, that is, they can be located in one place, or can be distributed on a plurality of network units. Some or all of the modules can be selected according to actual needs to implement the purpose of the present disclosure.

In addition, the functional modules in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

It is obvious to one of ordinary skill in the related art that the present disclosure is not limited to the details of the above embodiments, and the present disclosure can be implemented in other concrete forms without deviating from the spirit or basic characteristics of the present disclosure. The foregoing descriptions are merely embodiments of the present disclosure, but not intended to limit the protection scope of the present disclosure, the scope of the present disclosure shall be subject to be appended claims rather than be the foregoing description. Accordingly, this specification and accompanying drawings are only exemplary descriptions of the present disclosure as defined by the claims and are deemed to cover any and all modifications, variations, combinations or equivalents within the scope of the present disclosure. Furthermore, it is obvious that the terms "include", "includes", "including" don't exclude other units or steps, and the singular does not exclude the plural. The multiple units or devices described in the system claims can also be implemented by a unit or a device through software or hardware. The meaning of the term "second" shown in the specification is only used to indicate names of elements of the present disclosure, but not indicated that the elements of the present disclosure is shown in any particular order, important or represented the amount of the elements.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A cluster expansion method comprising:
    acquiring data of machines to be expanded, the data of the machines to be expanded comprising one or more of the following: a number of the machines to be expanded, and performance parameters of the machines to be expanded, and a fragment amount of the machines to be expanded;
    acquiring a number of machines in a cluster;
    when it is determined that the number of the machines to be expanded is not a multiple of the number of the machines in the cluster, acquiring a total data amount of current fragments in the cluster and a fragment amount of the current fragments, the total amount of current fragments in the cluster comprising a portion of the data of the machines to be expanded;
    migrating some data amount of each fragment in the current fragments to the machines to be expanded, according to the total data amount of the current fragments in the cluster, the fragment amount of the current fragments and the fragment amount of the machines to be expanded; and
    when it is determined that the number of the machines to be expanded is a multiple of the number of the machines in the cluster, configuring the machines to be expanded to be in the cluster, according to the performance parameters of the machines to be expanded;
    wherein the step of migrating some data amount of each fragment in the current fragments to the machines to be expanded, according to the total data amount of the current fragments in the cluster, the fragment amount of the current fragments and the fragment amount of the machines to be expanded, comprises:
    determining a data amount to be migrated of each fragment in the current fragments according to the total data amount of the current fragments, the fragment amount of the current fragments and the fragment amount of the machines to be expanded;
    determining a data block to be migrated of each fragment in the current fragments, according to the data amount to be migrated of each fragment in the current fragments;
    acquiring an address interval of the data block to be migrated of each fragment in the current fragments, according to the data block to be migrated of each fragment in the current fragments; and
    configuring each fragment in fragments of the machines to be expanded, according to the data block to be migrated of each fragment in the current fragments and the address interval of the data block to be migrated of each fragment in the current fragments.

2. The cluster expansion method as claimed in claim 1, wherein the step of configuring each fragment in fragments of the machines to be expanded, according to the data block to be migrated of each fragment in the current fragments, and the address interval of the data block to be migrated of each fragment in the current fragments, comprises: evenly dividing the data block to be migrated of each fragment in the current fragments into at least one sub-data block, according to the fragment amount of the machines to be expanded;
    evenly configuring the at least one sub-data block of each fragment in the current fragments to be each fragment in the fragments of the machines to be expanded, each fragment in the fragments of the machines to be expanded composing of one or more sub-data blocks; and
    configuring an address interval corresponding to the one or more sub-data blocks of each fragment in the fragments of the machines to be expanded to be an address interval of each fragment in the fragments of the machines to be expanded.

3. The cluster expansion method as claimed in claim 1, wherein the cluster expansion method further comprises when it is determined that the number of the machines to be expanded is not a multiple of the number of the machines in the cluster, under a schedule of an invocation mechanism of the cluster, configuring the machines to be expanded to be in the cluster by a asynchronous progressive form.

4. The cluster expansion method as claimed in claim 1, wherein the step of configuring the machines to be expanded to be in the cluster, according to the performance parameters of the machines to be expanded, comprises:

expanding the machines to be expanded in the cluster by collecting collection loops, and each collection loop in the cluster corresponding to a time parameter;

acquiring a storage data mount of each time period in the cluster; and configuring a collection loop of the machines to be expanded, according to the storage data amount of each time period in the cluster and the performance parameters of the machines to be expanded.

5. The cluster expansion method as claimed in claim 4, wherein the step of configuring a collection loop of the machines to be expanded, according to the storage data amount of each time period in the cluster and the performance parameters of the machines to be expanded, comprises one or more of the following combinations:

determining a time period of the storage data amount which is growing the fastest, according to the storage data amount of each time period in the cluster, and further determining a time parameter corresponding to the time period as a time parameter of the collection loop; or determining a time period of the storage data amount exceeding a preset value, according to the storage data amount of each time period in the cluster, and further determining a time parameter corresponding to the time period as a time parameter of the collection loop or configuring the machines to be expanded corresponding to each virtual node on the collection loop, according to the performance parameters of the machines to be expanded and a group of machines corresponding to each virtual node in the cluster.

6. The cluster expansion method as claimed in claim 4, wherein the cluster expansion method further comprises:

receiving an input index, a time corresponding to the index, and a file number corresponding to each document in the index;

querying a collection loop that matches with the time corresponding to the index, according to the time corresponding to the index;

querying a virtual node that matches with the file number corresponding to each document, according to the file number corresponding to each document; determining machines corresponding to the matched virtual node on the collection loop; and acquiring documents in fragments of machines in the determined machines and further providing the acquired document to users.

7. A cluster expansion apparatus comprising:

a memory; and a processor comprising:

an acquiring unit configured to acquire data of machines to be expanded, the data of the machines to be expanded comprising one or more of the following: a number of the machines to be expanded, performance parameters of the machines to be expanded, and a fragment amount of the machines to be expanded, the acquiring unit further configured to acquire: a number of machines in a cluster, and a total data amount of current fragments in the cluster and the fragment amount of the current fragments when it is determined that the number of the machines to be expanded is not a multiple of the number of the machines in the cluster, wherein the total amount of current fragments in the cluster comprises a portion of the data of the machines to be expanded;

a configuration unit configured to migrate some data amount of each fragment in the current fragments to the machines to be expanded, according to the total data amount of the current fragments in the cluster, the fragment amount of the current fragments and the fragment amount of the machines to be expanded, the configuration unit further configured to configure the machines to be expanded to be in the cluster, according to a storage data amount of each time period in the duster and the performance parameters of the machines to be expanded, when it is determined that the number of the machines to be expanded is a multiple of the number of the machines in the cluster;

wherein migrating some data amount of each fragment in the current fragments to the machines to be expanded, according to the total data amount of the current fragments in the cluster, the fragment amount of the current fragments, and the fragment amount of the machines to be expanded, comprises:

determining a data amount to be migrated of each fragment in the current fragments according to the total data amount of the current fragments, the fragment amount of the current fragments and the fragment amount of the machines to be expanded;

determining a data block to be migrated of each fragment in the current fragments, according to the data amount to be migrated of each fragment in the current fragments;

acquiring an address interval of the data block to be migrated of each fragment in the current fragments, according to the data block to be migrated of each fragment in the current fragments; and configuring each fragment in fragments of the machines to be expanded, according to the data block to be migrated of each fragment in the current fragments and the address interval of the data block to be migrated of each fragment in the current fragments.

8. An electronic device comprising:

a memory configured to store at least one instruction therein; and a processor configured to perform the at least one instruction to implement:

acquiring data of machines to be expanded, the data of the machines to be expanded comprising one or more of the following: a number of machines to be expanded, performance parameters of the machines to be expanded, and a fragment amount of machines to be expanded;

acquiring a number of machines in a cluster;

when it is determined that the number of the machines to be expanded is not a multiple of the number of the machines in the cluster, acquiring a total data amount of current fragments in the cluster and a fragment, amount of the current fragments, wherein the total data amount of current fragments in the cluster comprises a portion of the data of the machines to be expanded;

migrating some data amount of each fragment in the current fragments to the machines to be expanded, according to the total data amount of the current fragments in the cluster, the fragment amount of the current fragments and the fragment amount of the machines to be expanded; and when it is determined that the number of the machines to be expanded is a multiple of the number of the machines in the cluster, configuring the machines to be expanded to be in the cluster, according to the performance parameters of the machines to be expanded wherein migrating some data amount of each fragment in the current fragments to the machines to be expanded, according to the total data amount of the current fragments in the cluster, the fragment amount of the current fragments, and the fragment amount of the machines to be expanded, comprises:

determining a data amount to be migrated of each fragment in the current fragments according to the total data amount of the current fragments, the fragment amount of the current fragments and the fragment amount of the machines to be expanded;

determining a data block to be migrated of each fragment in the current fragments, according to the data amount to be migrated of each fragment in the current fragments;

acquiring an address interval of the data block to be migrated of each fragment in the current fragments, according to the data block to be migrated of each fragment in the current fragments; and configuring each fragment in fragments of the machines to be expanded, according to the data block to be migrated of each fragment in the current fragments and the address interval of the data block to be migrated of each fragment in the current fragments.

9. A non-transitory computer readable storage medium storing at least one instruction performed by a processor to implement the cluster expansion method of claim 1.

* * * * *